United States Patent [19]
Ling et al.

[11] Patent Number: 5,646,356
[45] Date of Patent: Jul. 8, 1997

[54] MAGNETOELASTIC NON-CONTACTING TORQUE TRANSDUCER

[75] Inventors: Hans Ling, Spånga; Jarl Sobel, Västerås; Dan J. Uggla, Kista, all of Sweden

[73] Assignee: Asea Brown Boveri AB, Vasteras, Sweden

[21] Appl. No.: 704,625

[22] PCT Filed: Mar. 22, 1995

[86] PCT No.: PCT/SE95/00289

§ 371 Date: Sep. 4, 1996

§ 102(e) Date: Sep. 4, 1996

[87] PCT Pub. No.: WO95/27191

PCT Pub. Date: Oct. 12, 1995

[30] Foreign Application Priority Data

Mar. 30, 1994 [SE] Sweden ................ 9401064

[51] Int. Cl.$^6$ ........................ G01L 3/00
[52] U.S. Cl. ............... 73/862.335; 73/862.333
[58] Field of Search ............ 73/862.321, 862.333, 73/862.334, 862.335, 862.336

[56] References Cited

U.S. PATENT DOCUMENTS

| | | | |
|---|---|---|---|
| 4,823,620 | 4/1989 | Edo et al. | 73/862.336 |
| 4,891,992 | 1/1990 | Kobayashi et al. | 73/862.336 |
| 4,907,462 | 3/1990 | Odama et al. | 73/862.335 |
| 5,052,232 | 10/1991 | Garshelis | 73/862.336 |
| 5,092,182 | 3/1992 | Ikeda et al. | 73/862.335 |

FOREIGN PATENT DOCUMENTS 667836  6/1979  U.S.S.R. .

*Primary Examiner*—Richard Chilcot
*Assistant Examiner*—Ronald Biegel
*Attorney, Agent, or Firm*—Watson Cole Stevens Davis, P.L.L.C.

[57] ABSTRACT

A magnetoelastic torque transducer for measuring, in a non-contacting manner, the torque in a stationary or a rotating shaft. The transducer comprises a shaft (1) with surrounding excitation windings (2, 3) and measuring windings (10, 11). Concentrically with the windings, anisotropic measuring zones are created by applying layers (8, 9), for example in the form of copper strips, on the surface of the shaft. The angle between the strips and a generatrix to the cylinder surface of the transducer shaft is in a preferred embodiment chosen to be ±45° (FIG. 5).

10 Claims, 2 Drawing Sheets

MAGNETOELASTIC NON-CONTACTING TORQUE TRANSDUCER

TECHNICAL FIELD

The present invention relates to a transducer for accurately measuring, in a non-contacting manner and within a large temperature range, the torque acting in a stationary or a rotating shaft.

BACKGROUND ART

A circular cylindrical shaft which is subjected to a torque is influenced by a pure shear stress. This stress state can be expressed, in terms of its principal stresses, as a compressive stress and a tensile stress, directed perpendicularly thereto, of the same magnitude. The principal stress directions are inclined at ±45° to the longitudinal axis of the shaft.

The state of the art as regards the constructive design of torque transducers is disclosed in a number of patent specifications and technical articles. Common to most of these solutions is that two zones are created in the magnetic material, with some type of anisotropy, which causes the magnetic flux density to be deflected at an angle away from its natural direction in parallel with the axis of the transducer shaft. In one zone the principal direction of the anisotropy coincides with the principal direction which provides tensile stress. In the other zone, the principal direction coincides with the direction which provides compressive stress.

Because of the magnetoelastic effect (in the case of positive magnetostriction), the zone reluctance will therefore decrease or increase if the magnetic flux density has been deflected towards the tensile direction or the compressive direction.

By finally measuring the difference in reluctance between these zones, a measure of the torque is obtained which has little sensitivity to axial forces or bending stress.

The reluctance difference is usually measured by creating a time-dependent H-field directed along the shaft and with equal amplitude in both zones, using a primary coil concentric with the shaft. With the aid of two identical secondary coils, centred around each zone, the difference in B-fields between the zones can be measured. This is achieved in the simplest way by connecting the secondary coils in opposition in such a way that the induced voltages in the respective coil are subtracted from each other. By phase-sensitive rectification of the secondary signal obtained in this way, it is possible, in addition, to distinguish between torsional moments of different directions.

This reluctance-measuring part in many cases constitutes a kind of magnetic yoke to the shaft and will, therefore, in the following be referred to as the "yoke".

To create a high sensitivity to torsional moments, it is required that the anisotropy is sufficient, such that the difference between the zones becomes as great as possible. A measure of the anisotropy is the angle at which the magnetic field is deflected from the natural direction parallel to the axis of the transducer shaft because of the influence of the anisotropy. If this angle is 45° in the zones, the anisotropy is optimal as the B-field is then directed along the principal stress directions of the transducer shaft loaded with torsion.

Of the utmost importance is maintaining a complete rotational symmetry, both with respect to the distribution of the mechanical stress and the magnetic field, in order to prevent a signal variation which is only due to the transducer being rotated in relation to the reluctance-measuring part.

What distinguishes different torque transducers according to the above general description is primarily the method of realizing the anisotropy.

SU 667836 describes a method in which the anisotropy is created purely geometrically in each zone by cutting grooves in the surface of the shaft according to a specific pattern. This pattern consists of a number of mutually parallel lines directed at an angle of 45° to the axis of the transducer shaft.

However, this solution entails an insufficient anisotropy and hence also low sensitivity, since the magnetic field can "creep under" the grooves in a relatively simple manner, unless these grooves are made deep. If the grooves are made deep, however, the stress level in the surface of the shaft, and hence also the sensitivity, will be lowered.

In addition, the grooves in the surface lead to greatly increased effective stresses in the bottom of the grooves and, therefore, the shaft can only be loaded to a moderate extent before plastic yielding of the shaft material sets in, which in turn leads to hysteresis in the output signal of the transducer.

U.S. Pat. No. 4,823,620 describes the same embodiment as above with respect to the geometrical anisotropy, however with the addition that the surface of the shaft is hardened or carburized for the purpose of reducing the hysteresis in the transducer.

In this U.S. patent specification it is also pointed out that it is not necessary to provide grooves in the surface of the shaft. It is also possible to create elevations in the shaft surface, or lands according to the above-mentioned pattern.

Further, the material in the above-mentioned lands or strips shall be non-magnetic and preferably a material with high electrical conductivity represented by copper.

One requirement on the strips according to U.S. Pat. No. 4,823,620, however, is that the width and thickness thereof should exceed the magnetic penetration depth, that is the skin depth, of the underlying material.

However, this requirement entails a considerable limitation of what is realizable in practice. A typical transducer material with a relative permeability of 120, a resistivity of $60 \cdot 10^{-8}$ $\Omega$meter, and a supply frequency of 2000 Hz will have a skin depth of 0.8 mm according to the accepted definition described below. In electrolytic plating of, for example, printed circuit-boards, the maximum rate of deposition is about 0.04 mm per hour. Plating a layer thicker than the skin depth would consequently in this case take far too long; instead, it is necessary, for example, to paste copper strips, which is hardly practical.

In addition, strips thicker than the skin depth have proved to entail considerable disadvantages as regards the temperature properties of the transducer.

One such property is the signal of the transducer in an unloaded state, that is, its zero signal. However, it is often possible to reset this signal at the temperature in question, in which case the temperature drift of the zero signal becomes less important.

Another transducer property, which is more difficult to eliminate, is the temperature dependence of the sensitivity of the transducer to torsional moments, the so-called sensitivity drift.

One known method of compensating for the above-mentioned sensitivity drift is to voltage-divide the signal with the aid of a network of temperature-dependent resistances or thermistors. An equivalent method is to simply load the secondary winding with a resistor, whereby essentially a voltage division is obtained between the copper resistance in the secondary winding and the external resistor.

Common to the above known methods of compensating the sensitivity drift is that they are costly and that the voltage division of the signal deteriorates both its output impedance and the signal level, hence increasing the sensitivity of the signal to disturbance.

Another and more serious drawback is that the sensitivity drift due to the temperature of the transducer shaft is compensated with a temperature drift in electric components in the reluctance-measuring part or at some other location, where the temperature may be completely different from the temperature of the shaft.

It would, therefore, be desirable to design a measuring zone which is self-compensating as regards the temperature drift of the sensitivity.

Since magnetoelastic transducers utilize a material property which is difficult to control accurately when preparing the material, the sensitivity of such transducers to mechanical stresses will depend on from which material batch the transducer is manufactured. This means that the sensitivity must be trimmed for each transducer, normally with the aid of voltage division of the secondary signal, which, as in the case with compensation of the sensitivity drift according to the above, leads to increased costs and increased sensitivity to disturbance.

Since by doing so a property of the shaft is compensated with a property of the reluctance-measuring yoke, this method also leads to the transducer shaft and the yoke not being replaceable between different transducers. This means that transducers and yokes must be kept in stock, handled, installed and possibly be replaced as one unit, which leads to higher costs and to a risk of the wrong shaft after all being paired together with the wrong yoke, resulting in incorrect sensitivity to torsional moments of the transducer.

It would, therefore, be desirable to design a measuring zone whose sensitivity to torsional moments can be trimmed in a simple manner depending on the material batch from which the magnetoelastic surface layer of the measuring zone is manufactured.

The above-mentioned economic and practical aspects may have a decisive importance when a torque transducer is to be used in applications requiring mass production and far-reaching rationalization, for example when measuring torque in cars.

SUMMARY OF THE INVENTION, ADVANTAGES

In a torque transducer according to the invention, good magnetic anisotropy is achieved with the aid of considerably thinner strips of conducting material on the shaft surface than what is described in U.S. Pat. No. 4,923,620.

An important condition for the invention is that the copper strips have very good electrical contact with the shaft material.

This method results in considerable advantages from the points of view of production technique and economy, and also makes possible a compensation of the sensitivity drift of the transducer shaft as well as a trimming of the sensitivity of the measuring zone to torsional moments.

In the following, a qualitative explanation will be given of the mechanism behind the alignment of the field according to the invention.

Figure 1:
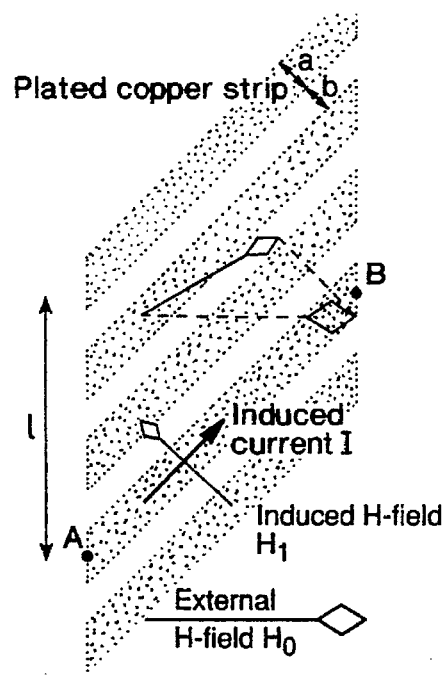
FIG. 1 shows the field distribution and the induced current at the plated copper layers.

Starting from FIG. 1, the following reasoning applies:

Let us consider an external H-field in the air above the shaft material, which as in the figure acts in a direction of 45° to the plated copper layers/strips. The H-field varies sinusoidally in time with the angular frequency ω.

From the start it is assumed that the induced H-field is negligible. The H-field in the shaft material then becomes equal to the external H-field. According to Faraday's law of induction, and since φ is sinusoidal, the potential difference between two points "A" and "B" on the copper strips then becomes:

$$V_{AB} = \frac{d\phi}{dt} = \omega\phi$$

where

φ=the absolute value of the total magnetic flux between A and B, across the external H-field ω=the angular frequency of the H-field The calculation of the magnetic flux is derived by means of known methods which are to be found in basic books on electromagnetism. The radius of the shaft is assumed to be much greater than the skin depth, so a rectangular coordinate system may be used.

The total flux φ is obtained by integrating the magnetic flux density from the surface and into the material, which gives $$\phi = \frac{\delta l}{\sqrt{2}} B_0 = \frac{\delta l}{\sqrt{2}} \mu_{Fe} H_0$$

where l=the distance between "A" and "B", across H0

δ=the skin depth=

$$\sqrt{\frac{2\rho_{Fe}}{\mu_{Fe}\omega}}$$

$\rho_{Fe}$=the resistivity of the steel $\mu_{Fe}$=the permeability of the steel $B_o$=the magnetic flux density in the surface of the material This equation may also serve as a definition of the effective permeability and the effective skin depth in those cases where the material exhibits non-linear ferromagnetism. In this case φ is to be interpreted as the absolute value of the fundamental tone of the time-varying magnetic flux.

The current in the copper strip now becomes:

$$I = \frac{V_{AB}}{R}$$

where
R=the resistance of the strip=

$$\frac{\rho_{Cu} l \sqrt{2}}{ha}$$

h=the thickness of a strip
α=the width of a strip

Figure 2:
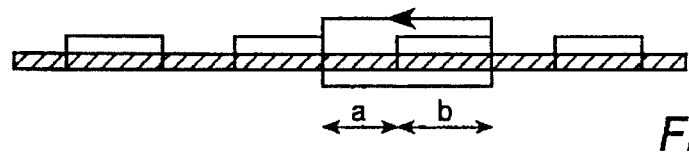
FIG. 2 shows how the currents induced in the copper strips are distributed when these are distributed around the whole shaft.

The resultant H-field from this current becomes approximately the same as if the current had been "spread" out over the whole surface according to FIG. 2. Such a homogeneous current distribution according to the dashed surface of FIG. 2 gives rise to an induced H-field which, according to Ampere's law, may be calculated to be:

$$H_1 = \frac{I}{2(a+b)}$$

Inserting this expression for the current, the resistance of the strip, the potential difference and the absolute value of the magnetic flux according to the above finally produces the ratio:

$$\frac{H_1}{H_0} = \frac{ha}{2(a+b)} \times \frac{\mu_{Fe}\omega}{2\rho_{Cu}} \times \sqrt{\frac{2\rho_{Fe}}{\mu_{Fe}\omega}}$$

which may be written as $$\frac{H_1}{H_0} = \frac{ha}{2(a+b)} \frac{\rho_{Fe}}{\rho_{Cu}} \sqrt{\frac{\mu_{Fe}\omega}{2\rho_{Fe}}}$$

$$\frac{H_1}{H_0} = \frac{1}{2} \frac{\frac{ha}{a+b} \rho_{Fe}}{\rho_{Cu} \delta}$$

This ratio, the so-called conductivity ratio, is the ratio between the conductivity of the copper layer and an effective conductivity for the shaft surface.

When this ratio is great, the induced field becomes great in relation to the applied field, and hence the field also becomes well aligned along the strips, which, of course, is a requirement for obtaining a good sensitivity to torsional moments.

The object of this mathematical reasoning, as indicated above, has not been to provide a strict derivation of the sensitivity of the measuring zone as a function of the transducer parameters. Instead, an attempt has been made to explain the fundamental physical principles and mechanisms which give rise to the alignment of the field according to the invention. In addition, reasons are given why the conductivity ratio is the dimensionless parameter which determines the anisotropy of the measuring zone, which, of course, if of fundamental importance to the sensitivity of the measuring zone and, as will be clear from the following, also to the temperature drift of the sensitivity.

In reality, of course, it is not the $H_0$ field that gives rise to the current which is induced in the copper strips but the resultant field that is the sum $H_0$ and $H_1$. Consequently, the angle between the copper strips and the resultant H-field will be lower when $H_1$ increases. In this way, the induced H-field is controlled such that the resultant H-field is aligned along the copper strips when the conductivity ratio increases. The sensitivity as a function of the conductivity ratio will, therefore, be saturated concurrently with the alignment of the field becoming increasingly better.

This result can, of course, be obtained with the aid of a strict theoretical derivation which takes into consideration the angle between the resultant field and the copper strips. The result may also be verified by means of experiments.

A requirement on the magnitude of the conductivity ratio may be translated into a requirement on the thickness of the strips, in which case, for the sake of simplicity, factors of the order one, that is, factors ½ and a/(a+b), are neglected. If the resultant conductivity ratio is designated "k" and this expression is solved with respect to the strip thickness "h", the following is obtained $$h = k\delta \rho_{Cu}/\rho_{Fe}$$

From a purely empirical point of view, it is found that "k" should be 1 in order to obtain good sensitivity to torsional moments. To obtain good sensitivity to torsional moments, it is thus required that the thickness of the strips shall be greater than the skin depth of the shaft material at the frequency and amplitude used for the magnetizing field multiplied by the ratio of the resistivity of the material in the strips to the resistivity of the shaft material.

Figure 3:
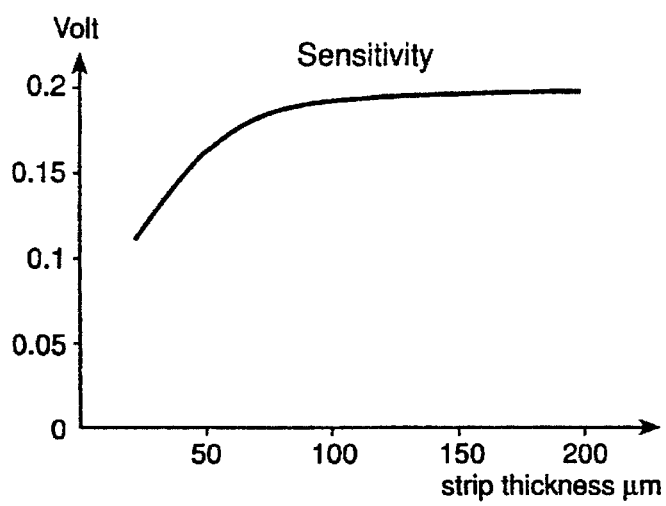
FIG. 3 shows how, for a given transducer design, the sensitivity varies with the thickness of the plated layers.

FIG. 3 shows the sensitivity of a transducer as a function of the thickness of the layer, which is proportional to the conductivity ratio. The effective skin depth in the material at the frequency in question is in this case approximately equal to 500 μm. As is clear from FIG. 3, the sensitivity has reached 90% of its final value even at around 70 μm, which, moreover, corresponds to a conductivity ratio of about 4.

Figure 4:
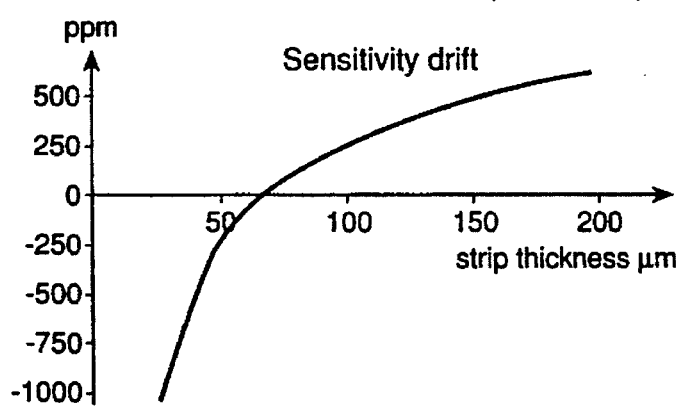
FIG. 4 shows how the sensitivity drift for the same transducer design varies with the thickness of the plated layers.

FIG. 4 shows the sensitivity drift as a function of the layer thickness for the same transducer. The sensitivity drift is here expressed in ppm of the sensitivity at room temperature and increases greatly with increasing layer thickness. When the layer thickness is the same as the skin depth, it amounts to about 1000 ppm/°C. In this case, the sensitivity drift is equal to zero at a layer thickness of about 70 μm.

It should also be noted that the compensation becomes stronger the greater the inclination of the curve, which according to FIG. 3 describes the sensitivity as a function of the thickness of the copper layer.

For very thin layers, an overcompensation takes place such that the sensitivity drift according to FIG. 4 is given a negative sign.

The explanation of the above-mentioned behaviour lies in the fact that the resistance of the copper layer also increases linearly with the temperature. In this way, the conductivity ratio decreases proportionally, and the alignment of the field is deteriorated. This, in turn, leads to a reduction of the sensitivity, which thus compensates for the increase of the sensitivity with the temperature for a transducer with a completely aligned field.

The sensitivity drift in the shaft, and the dependence of the sensitivity on the conductivity ratio, depend on a plurality of factors, among them the properties of the transducer material, the supply frequency, the amplitude of the supply current, the layer thickness, and the exact geometrical shape of the reluctance-measuring part and of the copper pattern.

The elimination of the sensitivity drift must thus be made specifically for each transducer design but applies generally to different specimens of the same type of transducer. It is, however, possible according to the above reasoning and FIG. 4, at a given geometrical shape, a given supply frequency, supply current, etc., to obtain zero sensitivity drift by a suitable choice of layer thickness.

By varying the layer thickness around a given value, it is also possible to obtain fine trimming of the sensitivity of the measuring zone to torsional moments, which is clear from FIG. 3. This trimming can be carried out such that, depending on the magnetoelastic properties of a given material batch, the thickness which is to be used for this batch is determined exactly. For transducers with very high demands for accuracy, a somewhat too thick layer may be plated and the layer thickness be reduced by mechanical, electrolytic or chemical influence in connection with individual calibration of each transducer shaft. In this way, perfect sensitivity may be obtained, independently of a certain variation of the material properties and other manufacture.

The layer thickness cannot, of course, be adapted both for trimming the sensitivity and compensating the sensitivity drift to zero. A certain variation of the sensitivity drift is, however, permitted in most cases, which creates space for trimming of the sensitivity according to what is described above.

It is not necessary that the anisotropy is caused by thin discrete strips of material of a high conductivity in good electrical contact with the shaft material.

It would serve equally well to coat the whole surface with a material which exhibits high anisotropy in the electrical conductivity. Such materials are available among the electrically conducting plastic materials which are under development.

In this case, the material would be oriented such that that material which exhibits the highest conductivity would be directed in different principal stress directions along the shaft, in those cases where the transducer is provided with two measuring zones.

Nor is the number of measuring zones in the transducer essential to the invention.

DESCRIPTION OF THE PREFERRED EMBODIMENTS

Figure 5:
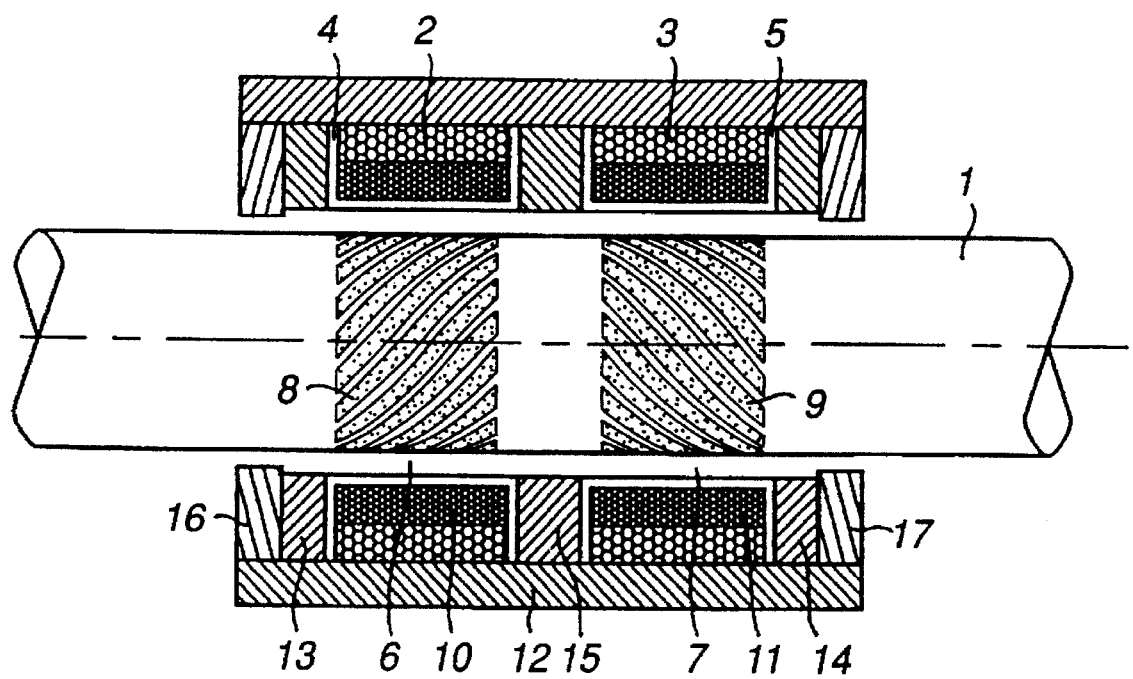
FIG. 5 shows a transducer design according to the invention.

A preferred embodiment of a magnetoelastic transducer for electrical measurement of torsional stresses in a shaft according to the invention is shown in FIG. 5, which shows an axial section through the shaft of the rotationally symmetrical transducer.

The transducer comprises a circular-cylindrical shaft 1 in which the torque is to be measured. The transducer is, in part or along the whole of its length, ferromagnetic and magnetoelastic, at least in a surface layer symmetrically distributed around the shaft.

Further, the transducer comprises a device for creating an axially directed magnetizing field, cyclically varying in time, in the magnetoelastic part of the shaft. This device comprises two primary coils 2, 3, wound in two bobbins 4, 5, concentric with the torque-sensing shaft 1. The primary coils are series-connected and are connected to a signal generator.

In the ferromagnetic part and concentrically with the primary coils, two measuring zones 6, 7 are created in the shaft. In one of the zones, the axially directed magnetizing field is deflected along that principal stress direction which provides tensile stress when the transducer shaft is loaded in torsion. In the other measuring zone, the field is deflected along the principal stress direction which provides compressive stress.

The deflection of the magnetizing field is caused by plated copper strips 8, 9, which are considerably thinner than the skin depth in the ferromagnetic shaft and which are applied by a method which gives perfect electrical contact between the copper strips and the underlying shaft material, represented by electrolytic plating. The thickness of the layer is adapted to obtain minimum sensitivity drift and correct sensitivity to torsional moments in the transducer shaft depending on the magnetoelastic properties of the material from which the measuring zones are manufactured.

The width of the copper strips in the preferred embodiment has been chosen to be two-thirds of the centre distance between two adjacent strips. In a preferred embodiment, the angle between the strips and a generatrix to the cylinder surface of the transducer shaft has been selected to be 45°, but within the scope of the invention it may be selected to be at least 20° and at most 75°.

Figure 6:
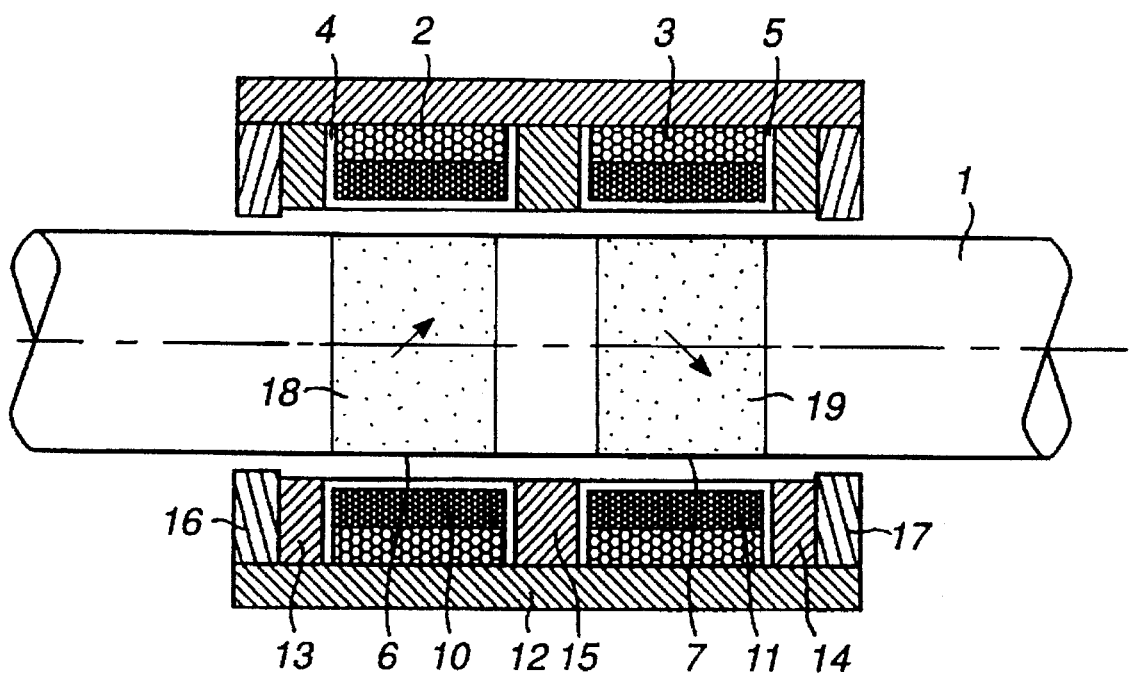
FIG. 6 shows an alternative transducer design according to the invention.

As mentioned under the summary of the invention, it is not necessary that the anisotropy is caused by thin discrete strips of a material with a high conductivity in good electrical contact with the shaft material. It would serve equally well to coat the whole surface annularly with a material which exhibits a high anisotropy in the electrical conductivity. Within the scope of the invention, such an embodiment is shown in FIG. 6 which, apart from the annular layers 18, 19, is identical with an embodiment according to FIG. 5.

The transducer also comprises a device for electrically measuring the reluctance differences between the zones induced by the torsional stresses.

One simple method of realizing the above is to measure the derivative of the flux in the measuring zones 6, 7 via two secondary coils 10, 11 which are wound onto the same bobbins as the primary windings. By connecting the secondary windings in opposition, a voltage difference corresponding to the flux difference is generated. This voltage is connected to a phase-sensitive rectifier which, in turn, is controlled by the phase of the supply signal generator. The higher frequencies of the output signal are filtered away in a low-pass filter, whereupon a direct voltage is obtained which is proportional to the torque which loads the shaft.

To prevent the torque transducer from being influenced by magnetic or electrically conducting objects in the vicinity thereof, to increase the sensitivity to torques, and to reduce the power requirement of the transducer, it is desirable to confine and control the magnetic field such that its extent is limited to a region around the torque-measuring zones 6, 7 and the reluctance-measuring devices 10, 11 associated therewith.

This is achieved by surrounding the bobbins with a yoke of soft-magnetic material. The yoke consists of a shell 12 and of two poles 13, 14 which concentrate the flux to the air gap at the ends of the yoke. The design of the shell and the poles may vary both as regards the choice of material, the geometrical dimensions, and the number of parts included therein. Of importance is, however, that the poles are well centred around the shaft to maintain the rotational symmetry of distribution of the magnetic field. The magnitude of the air gap suitably amounts to 0.5–1 mm. To facilitate the redistribution of the flux between the zones and hence increase the sensitivity, the yoke is also provided with a pole 15 between the bobbins. This yoke may be omitted, in which case the bobbins 4, 5 may be replaced by one single bobbin. In addition, the yoke may be provided at the axial ends with annular washers 16, 17 of non-ferromagnetic but well electrically conducting material, for example aluminium, which further prevent the flux from "leaking out" in the axial direction.

We claim:

1. A magnetoelastic torque transducer for electrically measuring torsional stresses in a shaft (1) with a cylindrical part 5 which at least in a surface layer around the whole shaft is ferromagnetic and magnetoelastic, said transducer comprising a first device (2, 3) for creating an axially directed magnetizing field, cyclically varying in time, in the magnetoelastic part of the shaft with a skin depth determined by taking into account the frequency as well as the amplitude of the varying magnetizing field, at least one zone (6, 7) in the magnetoelastic part of the shaft provided with an anisotropy, the effect of which is to deflect the magnetic flux density in a direction away from the natural flux direction along the shaft, and a second device (10, 11) for electrically measuring the changes of the reluctance, induced by the torsional stresses, in each one of the zones provided with anisotropy, wherein said anisotropy is achieved by the provision of a number of parallel strips (8, 9) in good electrical contact with the magnetoelastic material in the surface, said strips being of a material with low resistivity and being directed at an angle to the longitudinal axis of the transducer shaft, the thickness of the strips being smaller than the skin depth of the shaft material at the frequency and amplitude of the magnetizing field, but greater than the skin depth multiplied by the ratio of the resistivity of the material in the strips to the resistivity of the material in the shaft.

2. A magnetoelastic torque transducer according to claim 1, wherein the thickness of said strips is smaller than half of said skin depth.

3. A magnetoelastic torque transducer according to claim 1, wherein the resistivity of the material in said strips exhibits a positive temperature coefficient and that the thickness of said strips, at a given geometrical shape, supply frequency and supply current, is adapted such that the increase of the sensitivity of the transducer to torsional moments with the temperature is compensated for by the reduction in the sensitivity which is due to the fact that the deflection of the magnetic flux density in a direction away from the natural flux direction along the shaft decreases because of the increase in resistivity of the strips.

4. A magnetoelastic torque transducer according to claim 1, wherein the thickness of said strips is adapted depending on the magnetoelastic properties of said magnetic part, such that the sensitivity to torsional moments of this part becomes independent of moderate variations of said magnetic properties between different transducer shafts by providing material which exhibits a high sensitivity to torsional moments with a thinner layer than material which exhibits a lower sensitivity.

5. A magnetoelastic torque transducer according to claim 1, wherein said strips are applied to the surface by electrolytic plating.

6. A magnetoelastic torque transducer according to claim 1, wherein the angle between the strips and a generatrix to the cylinder surface is greater than 20° and smaller than 75°.

7. A magnetoelastic torque transducer for electrically measuring torsional stresses in a shaft (1) with a cylindrical part which at least in a surface layer around the whole shaft is ferromagnetic and magnetoelastic, said transducer comprising a first device (2, 3) for creating an axially directed magnetizing field, cyclically varying in time, in the magnetoelastic part of the shaft, a skin depth determined by taking into account the frequency as well as the varying magnetizing field, at least one zone (6, 7) in the magnetoelastic part of the shaft provided with an anisotropy, the effect of which is to deflect the magnetic flux density in a direction away from the natural flux direction along the shaft, and a second device (10, 11) for electrically measuring the changes of the reluctance, induced by the torsional stresses, in each one of the zones provided with anisotropy, wherein said anisotropy is achieved by coating the whole surface of said zone with an annular layer (18, 19) in good electrical contact with the magnetoelastic material, said surface consisting of a plastic material which exhibits a high anistropy in its electrical resistivity, and wherein that direction in which the resistivity of the layer is lowest is directed at an angle to the longitudinal axis of the transducer shaft.

8. A magnetoelastic torque transducer according to claim 7, wherein the resistivity of the material in said layer exhibits a positive temperature coefficient and that the thickness of said strip, at a given geometrical shape, supply frequency and supply current, is adapted such that the increase of the sensitivity of the transducer to torsional moments with the temperature is compensated for by the reduction in the sensitivity which is due to the fact that the deflection of the magnetic flux density in a direction away from the natural flux direction along the shaft decreases because of the increase in resistivity of the layer.

9. A magnetoelastic torque transducer according to claim 7, wherein the thickness of said strips is adapted depending on the magnetoelastic properties of said magnetic part, such that the sensitivity to torsional moments of this part becomes independent of moderate variations of said magnetic properties between different transducer shafts by providing material which exhibits a high sensitivity to torsional moments with a thinner layer than material which exhibits a lower sensitivity.

10. A magnetoelastic torque transducer according to claim 7, wherein the angle between the direction where the resistivity of said layer is lowest and a generatrix to the cylinder surface is greater than 20° and smaller than 75°.

* * * * *